May 5, 1925.
S. APOSTOLOFF
GALVANIC CELL
Original Filed Aug. 22, 1918
1,537,023
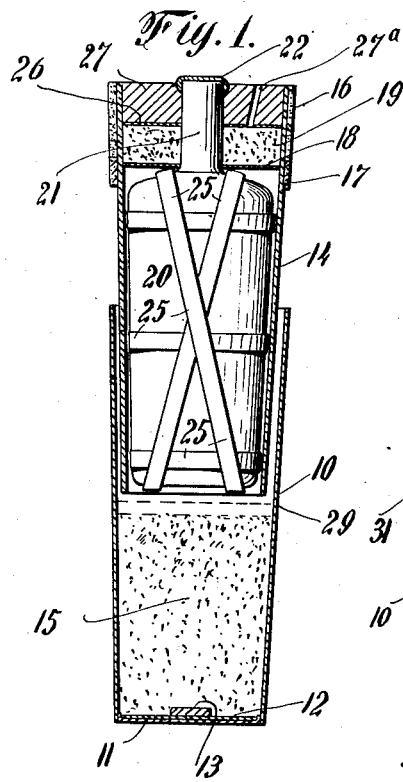
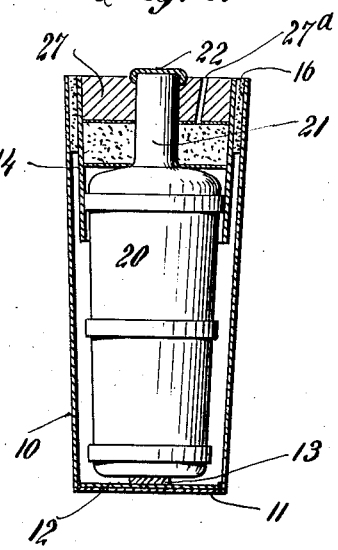
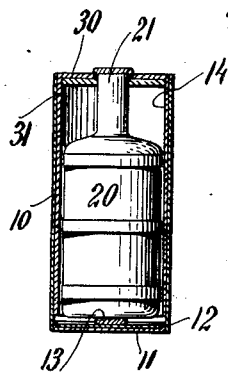
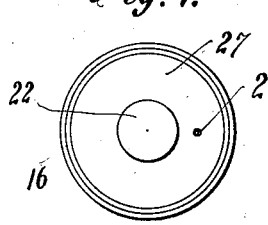
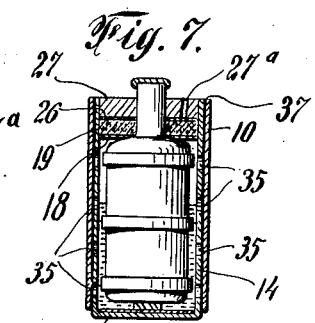
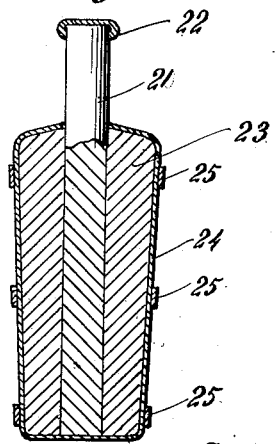
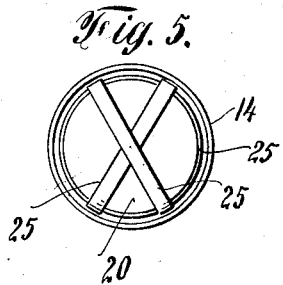
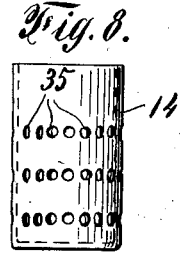
Inventor
Serge Apostoloff,
By his Attorney
William Richards Patented May 5, 1925.

1,537,023

UNITED STATES PATENT OFFICE.

SERGE APOSTOLOFF, OF NEW YORK, N. Y., ASSIGNOR TO UNION DRY BATTERY CORPORATION OF AMERICA, OF NEW YORK, N. Y., A CORPORATION OF DELAWARE.

GALVANIC CELL.

Application filed August 22, 1918, Serial No. 250,974. Renewed June 15, 1921. Serial No. 477,865.

*To all whom it may concern:*

Be it known that I, SERGE APOSTOLOFF, a subject of the King of Great Britain and Ireland, residing at New York, in the county and State of New York, have invented certain new and useful Improvements in Galvanic Cells, of which the following is a specification.

This invention relates to battery elements, and particularly of the type used for telephones, telegraphy, flashlights, and various other purposes; and has for its object to construct such batteries in such manner that they may remain inactive until they are required for use, when they may be made active by the simple addition of water to the electrolytic salts.

A further object of this invention is to provide means whereby the necessary water may be easily and quickly added to the electrolytic material by the user, and the battery cells made ready for instant use.

A still further object of the invention is to form what is known as a reserve cell in such manner that it will develop its full working capacity immediately that the water is added to the electrolytic material and the several elements of the battery cell placed in working position.

A still further object of this invention is to construct such cell in a simple and economical manner, and so that it will be thoroughly practical and efficient in use, and in a form that can be sold to the trade or to users with full confidence that its life and usefulness will not be shortened or impaired during non-use, and that it will act immediately and for the full life of the cell when put into use as above described.

Heretofore, all dry or semi-dry batteries of this type have been sent out from the factories fully charged, complete and ready for action, except the so-called reserve cells, which are provided with means to enable the purchaser to set them working after the purchase of the same; in other words, to start their limited life at the moment he may require same to act, their action being suspended until such time as the consumer introduces into said reserve cell the required amount of water to animate it.

All dry or semi-dry batteries which are completely finished at the factories, that is to say, which are fully charged and filled with the necessary electrolyte, are, without exception, highly perishable goods, their action being limited to the time when their active ingredients become exhausted. This being the case, no matter whether such batteries are in full use, or remain in the hands of the retailers, who frequently find them quite dead and unsalable, the usual practice of the manufacturers is to limit the guaranteed life of such cells or batteries to a given date, and to stamp such goods with a time limit beyond which their usefulness will not be guaranteed.

In order to form the so-called reserve cells two methods of construction have heretofore been resorted to. By one method the carbon element is constructed in tubular form, pierced with lateral openings at a number of points throughout its length, the water required to activate the cell being poured into the carbon tube and allowed to pass through said openings to the depolarizing material, which it finally penetrates and mixes with the electrolytic mixture.

By the second method zinc tubes, also pierced with lateral openings, are interposed between the absorbent paper with which the zinc container is lined, and the inner wall of the container, and water is poured into these tubes to activate the electrolyte.

These methods, however, have objectionable disadvantages, the first of which is that corks or stoppers are required to close the openings through which the water is introduced into the cell, involving more or less leakage, which in turn is liable to affect the working of the cell by removing necessary moisture therefrom.

A second disadvantage consists in the unreasonable length of time required, and the difficulty encountered in introducing the water into the cell through the small openings provided therefor.

A still more objectionable disadvantage consists in the fact that when water is introduced through the hollow carbon, usually some five or six hours or more are wasted before the battery is working with its full degree of activity, this time being required before the water will pass through the lateral openings and penetrate the depolarizing material and mix with the electrolyte.

A further disadvantage is that these methods are only applicable to cells of a certain size, for example, in small cells the filling holes would be so small as to be useless for the purpose. Moreover, small cells for such purposes as flash-lights are always made up in batteries by the manufacturers, and the production of reserve cells for such uses has been considered impossible from a practical and commercial point of view.

My invention is intended to overcome all these disadvantages, and to create a practical, commercially successful, dry or semi-dry cell, which, while awaiting sale to a consumer, or after such sale and before use, will remain inactive, and which may be started into action, without waiting or delay, at any time it is needed for use, and which will then give the full maximum work of which the elements are capable.

These and other objects of my invention are set forth in the following specification, and are shown in the accompanying drawings which form a material part of this disclosure, and in which:—

Figure 1, is a central, vertical, sectional view of a battery cell showing one form of my invention, the inner container being shown as partly removed from the outer container thereof;

Figure 2 is a view showing a modified form of inner container, the elements being in their assembled working positions ready for operation;

Figure 3 is a central, vertical sectional view of one form of bobbin adapted for use with my invention;

Figure 4 is a top plan view of the assembled cell;

Figure 5 is a bottom plan view of the inner container and bobbin shown in Figure 1;

Figure 6 is a central vertical sectional view showing a modified form and arrangement of the containers;

Figure 7 is a central vertical sectional view of a still further modification; and, Figure 8 is a side elevational view of the inner container shown in Figure 7.

Broadly speaking, my invention includes forming my battery cell of a plurality of containers, adapted to hold the electrodes, depolarizing mass, and electroylytic salts in a dry state, and capable of temporary partial or complete separation from each other for the purpose of adding water to the electrolytic salts, and then of assemblage for use.

Referring now to Figures 1 and 2, of the drawing, 10 indicates an outer tubular container, preferably formed of zinc, and tapering from the top to the bottom thereof, and which is provided with a bottom 11, which may be secured to the tubular body by soldering, or otherwise as desired. A cardboard or other suitable washer 12, covers the top of said bottom for insulative purposes, while a smaller, supplemental washer 13 is secured to the top of the washer 12, and in a central position thereupon, to act as a rest for the bottom of the bobbin 20, as hereinafter more fully explained.

An inner tubular container 14, preferably also of zinc, open at its top and bottom, is shaped to correspond with the container 10 and to fit closely within the same. This inner container receives the bobbin 20, which is inserted therein, and which is of usual construction, comprising the carbon electrode 21, having a brass cap or other suitable terminal 22, the depolarizing mass 23 being arranged around the carbon electrode for a portion of its length as a sleeve, and having an insulating wrapping 24 of cotton fabric, or other suitable material, secured around the depolarizing mass by the rubber bands 25, or by wrappings of thread in the well-known manner.

Owing to the tapering form of the inner container the bobbin may be securely seated therein by engagement with the walls thereof, the open bottom of this container, the absorbent wrapping and rubber bands, and the elevation of the bobbin from the bottom of the outer container by means of the washer 13, permitting the electrolyte a free access to, and circulation around the bobbin.

The electrolyte 15 is introduced into the lower portion of the container 10 in a dry powder, and preferably comprises chloride of ammonia or chloride of zinc, mixed with dry starch which has been rendered soluble and jellyfiable with alcohol or acid in well known manner.

The upper portion of the outer wall of the container 14 is coated with a thin film of a suitable adhesive 16, such, for example, as cement, varnish, wax, rubber, or the like so that when the inner container is assembled in working form in the outer container, as shown in Figure 2, a seal will be formed between and at the tops of the two containers, thus closing the cell in the same manner as the cork in a bottle.

In order to hold the two containers together in an unassembled position, and retain the electrolyte in proper place therein, I form a band 17 of paper, or other suitable material, around the top of the container 14, below the adhesive film 16, in position to engage the top wall of the outer container when the inner container is inserted therein, and to hold these parts together in partially assembled positions, and also for preventing moisture from passing between said containers to the electrolyte. When assembling the cell for use the band 17 may be easily removed.

The bobbin 20 being properly inserted within the inner container, I place a cardboard washer 18 over the top of the bobbin, and form a layer 19 of dry absorbent material such as sawdust, sand, kieselguhr, pumice stone, or any other spongy or pulpy substance in a dry state, upon said washer.

The purpose of this material is to prevent liquid from the interior of the cell from getting upon the top of the cell where it might corrode the brass terminals. A second cardboard washer 26 is then placed over the layer 19, and a filling 27 of melted pitch or other suitable material, is formed over the top of the cell. A vent 27$^a$ is formed through the pitch to the dry layer of absorbent material 19.

During my numerous tests I have found that the use of starch in the electrolyte material may be satisfactorily substituted by the employment of a well dried powder of cellite, or kieselguhr, mixing it with the electrolytic salts in the proportion of from 2 to 5 parts of the former to 1 part in volume of the latter.

In Figure 2, I have shown a modified form in which the inner container is shortened, with the bobbin freely projecting outwardly from the bottom thereof. It can be made as short as desired, even be reduced to the proportions of a ring, so long as it will act to maintain the bobbin in operative position and permit the washers, absorbent material, and pitch to be assembled therein as hereinbefore described.

The thickness of the adhesive film is so small that the zinc surfaces of the inner and outer containers, when assembled, are in full electrical contact substantially throughout their length except of course at the narrow space at the top occupied by said adhesive film.

Instead of employing wax between the top portions of the two containers, any dry adhesive may be substituted therefor, which, when moistened by the water used for filling the cell, or by the normal overflow thereof when the containers are assembled, will cause the latter to adhere to each other and prevent possible leakage from between them, thus directing all gaseous emanations to the vent 27$^a$.

29, indicates the approximate level to which the water may be filled in the container when starting the cell to work.

In operation the outer container is supplied with the required quantity of the dry electrolytic salts, and the inner container with the bobbin arranged within it, as hereinbefore described, is inserted in the outer container, the band 17 acting to hold said containers together and prevent escape of the electrolytic salts, being forced into close frictional engagement with the wall of the container 10.

When it is desired to make the cell active the inner container is removed, the band taken off, and a little water poured upon the electrolytic salts, the latter being shaken in the outer container for a moment. The inner container is then re-inserted into the container 10 until the tops of both are level with each other, as shown in Figure 2. As this is done, the wax or adhesive 16 causes a seal between the tops of the containers. My cell, thus formed, becomes immediately active when thus assembled, developing its full working capacity, and will have a life limited only by the capacity of its material parts.

In Figure 6, I have shown a modified form of battery cell in which the inner container is formed with a closed top 30, through which the upper end of the carbon electrode with its brass cap or terminal 22 protrudes, a washer 31 being seated around the end of the carbon below said top to seal this end of the cell. This construction obviates the necessity for using the pitch filling 27, and absorbent layer 19, the cell thus formed being substantially constructed and adapted for operation and use in the manner before described. A seal of wax or dry adhesive may be placed between the walls of the containers to prevent leakage.

In Figures 7 and 8 I show still a further modified form of my invention in which the inner container has a plurality of lateral perforations 35 extending through its side walls, and a bottom 36, formed integral with, or soldered or otherwise secured to said side walls. In this case the outer container which may be tubular, corresponds in shape to the form of the inner container, and may be of non-conductive material, such as cardboard, having a pitch, cement or other adhesive lining 37 to insure a moisture-proof contact with the outer wall of the inner container, and to prevent leakage from between them.

This outer container is somewhat shorter than the length of the inner container, so that the lower end of the latter extends outwardly from the bottom of said outer container.

The bobbin 20 is spaced apart from the inner wall of the inner container so as to permit free access of the electrolyte thereto, and is supported within said container upon the washers 12, 13, in the bottom thereof, and by the washers 18, 26, and the pitch filling 27 in the top portion thereof. The dry electrolytic salts in this case are placed in the inner container.

When it is desired to use the cell the inner container is removed from the outer sleeve-like container and immersed in water for a moment and is then replaced in the outer container. The water enters the perforations 35 during the immersion and moistens the electrolytic salts making them active.

In this construction the bottom 36 forms one terminal and the brass cap 22 the other terminal of the cell.

Although I have described my invention more particularly with respect to flashlight batteries, or small cells, it will be understood that it is applicable to all forms of dry or semi-dry cells.

Various modifications may be made in the construction and arrangement of parts without departing from the spirit of my invention.

What I claim as new and desire to secure by Letters Patent is:

1. In a dry cell, a container electrode having a supply of dry materials adapted to form an electrolyte paste by the addition of water thereto, a tubular element carrying a bobbin electrode fitting within said container electrode and telescoping therewith, and means for initially holding said electrodes in inoperative position with the bottom of said bobbin longitudinally spaced above said supply of electrolyte salts.

2. A battery cell comprising an outer container adapted to hold an electrolytic salt, a second container, a bobbin carried by the second container, said second container being adapted to be inserted in the first container after the placing of a solvent for the electrolytic salts therein, with the said bobbin extending into the electrolytic solution, and an adhesive material extending around the upper portion of one of said containers adapted to seal the second container in position.

3. A battery cell comprising an outer container adapted to hold an electrolytic salt, said container forming one electrode of the cell, a second container having an open bottom, a bobbin carried by the second container and spaced inwardly from the wall thereof, said second container being adapted to be inserted in the first container after the placing of the solvent for the electrolytic salt therein with the said bobbin extending into the electrolytic solution.

4. In a dry cell, a container electrode carrying a supply of dry electrolyte materials, an interior sleeve carrying a bobbin electrode and depolarizing mass, said sleeve fitting within said container electrode, the top portion of said sleeve being provided with sealing means so that when the tubular sleeve and the outer container electrode are assembled they will be sealed and fit together like a cork in a bottle.

5. In a dry cell adapted to remain inactive until it is desired to put the cell into use, two opposed telescoping cup shaped members, one of which contains a supply of dry materials adapted to form an electrolyte paste upon the addition of water thereto, said cell being provided with electrodes normally inactive, but adapted to become active when said dry materials are moistened with water and said cup shaped members are moved relatively to one another.

6. In a dry cell adapted to remain inactive until it is desired to put the same in use, two opposed telescoping cup shaped members adapted to tightly fit one within the other and initially held substantially spaced from their collapsed operating position, a supply of dry electrolytic salts contained in the outer of said telescoping cups below the initial position of the bottom of the inner of said telescoping cups, said cell being adapted to be activated by removing the inner of said cups, adding water to the dry electrolytic salts, and forcing said cups together into operating tightly fitting position.

7. In a dry cell adapted to remain initially inactive, an outer cup shaped electrode member containing a supply of dry electrolyte salts, a tubular member fitting therewithin, said tubular member comprising a cylindrical tube open at the bottom and carrying a central bobbin, said tubular member and outer electrode member normally separated in inoperative position, said cell being adapted to be activated by dissolving said dry salts in water and telescoping said members.

8. A battery cell having inner and outer containers removably secured together, and in open communication with each other, one of said containers being adapted to act as an electrode, and means for holding the electrolytic salts and the other electrode and depolarizing mass within said containers, said containers being adapted to be separated for the addition of water to said salts, and then to be re-assembled for use and means for sealing said cell.

9. A battery cell of the type described comprising an outer container, an inner container seated against the inner wall of said outer container and in open communication therewith, said inner container being substantially cylindrical and having a continuous surface of permanent diameter, elements capable of generating an electric current upon the addition of water arranged within said containers, said containers being capable of separation for the introduction of water to the elements and of re-assembling for use.

10. A battery cell of the type described comprising an outer container, an inner container slidably secured to the wall of said outer container and in open communication therewith, dry active material in said containers, and a bobbin containing a carbon electrode and a depolarizing mass arranged within said inner container said containers being capable of separation for the introduction of water therein, said cell being made active by thereafter tightly collapsing said containers.

11. A battery cell of the type described comprising an outer container, an inner container slidably secured to the inner wall of said outer container and in open communication therewith, dry active material in said containers, and a bobbin containing a carbon electrode and a depolarizing mass arranged within and spaced from the wall of said inner container, said containers being capable of separation for the introduction of water therein, and being adapted to be made active by thereafter collapsing said containers.

12. In a dry cell of the type where the electrodes are kept out of operative position until it is desired to put the cell into use, a container, a supply of dry electrolytic salts in said container, a bobbin consisting of a carbon electrode and a depolarizing mass, and a tubular electrode element surrounding the bobbin and connected thereto.

13. In a dry cell adapted to remain inactive until it is desired to put the cell into use, a bobbin consisting of a carbon electrode and a depolarizing mass, a sleeve surrounding and extending substantially the full length of said bobbin, a cup shaped outer electrode member, dry activating material in said cup shaped member adapted to become active upon the addition of water thereto, and means initially carried by said sleeve for engaging the outer cup shaped electrode member and holding the bobbin above said dry activating material during cell inactivity.

14. In a dry cell of the type adapted to remain inactive until it is desired to put the same into use, a bobbin consisting of a carbon electrode and a depolarizing mass, a tubular element connected to the bobbin and spaced therefrom, a zinc electrode cup fitting said tubular element, and means whereby the cell is put into activity upon the addition of water to the zinc cup and subsequent movement of the tubular element into said zinc cup.

15. In a dry cell adapted to remain inactive until it is desired to put the cell into use, a zinc cup, a carbon electrode, said zinc cup initially containing dry electrolyte material and the bottom of said cup serving as one terminal of the cell after said dry material is dissolved in water and the cell has been activated.

16. A dry battery including a cup, a cap adapted to telescope with respect to said cup, means for normally preventing such telescoping action, and active members associated with said cup and cap respectively.

In testimony whereof, I have signed my name to this specification this 19th day of August, 1918.

SERGE APOSTOLOFF.